United States Patent Office 3,401,086
Patented Sept. 10, 1968

3,401,086
INDICATING DEVICE AND METHOD FOR THE DETERMINATION OF CHOLINESTERASE ACTIVITY IN THE SERUM
Arno Hoffmann, Darmstadt-Eberstadt, and Hermann Lang, Werner Neumann, Dieter Waldi, and Arnold Hartel, Darmstadt, Germany, assignors to E. Merck A.G., Darmstadt, Germany
No Drawing. Filed Jan. 26, 1966, Ser. No. 523,029
Claims priority, application Germany, Jan. 26, 1965, M 63,921
10 Claims. (Cl. 195—103.5)

This invention relates in general to a method and device for measuring the enzyme activity of tissue extracts or other biological fluids, and, more particularly, to the colorimetric determination of cholinesterase activity in body fluids.

The determination of the activity of serum cholinesterase is important in the early diagnosis of various disease states. For example, degenerative liver disorders and poisoning caused by organic phosphoric acid esters can be detected by the reduction in cholinesterase activity, and even the degree of poisoning can be established. Also, the efficacy of drugs which inhibit cholinesterase activity can be evaluated. Further, it is desirable and often imperative to determine the level of cholinesterase in the serum of a patient undergoing surgery before the administration of a muscle relaxant. Some insecticides in common use depress cholinesterase activity, and tests for the activity of this enzyme in the serum can be useful in detecting over-exposure to these agents.

In addition to biological assays, various chemical processes have been proposed for measuring the serum cholinesterase activity. In one such method, a serum specimen is added to either a small amount of substrate (acetylcholine) in solution or to a paper strip containing the same in addition to a color indicator which reflects colorimetrically the quantity of acetic acid liberated from the substrate by cholinesterase. However, the reagents used in this latter test do not provide a rapid determination of cholinesterase activity, since long incubation periods of the enzyme, substrate, and color indicator are required. Over and above this, the paper strip methods available thus far give, for the most part, inexact results and only a rough approximation of the cholinesterase content. Thus, for example, a known test paper for the determination of cholinesterase activity which contains bromothymol blue as indicator requires very long incubation periods (e.g. up to 60 minutes in the testing of sera of diagnostic interest with a low cholinesterase activity). Changes in the color tone are difficult to recognise on this indicator, so that only a rough estimate of the cholinesterase activity is possible. Furthermore, the indicator used records such a limited pH range that it is impossible to make any readings at all in the case of very high or very low cholinesterase activity.

So far as was suggested, to determine the time required to attain a particular color tone of the test paper containing bromothymol blue the whole duration of the test must also be observed.

In all of the known rapid processes for the determination of cholinesterase activity, furthermore, it is of great disadvantage that the pH of the sera, which is variable even before mensuration (pH 7.5 to about 8.2), cannot be taken into consideration at mensuration. The pH determined by the known rapid methods therefore does not exactly reflect the true cholinesterase activity.

It is therefore a principal object of the present invention to provide an improved device for measuring the content and activity of cholinesterase in body fluids.

It is another object of this invention to provide an improved method of rapidly and accurately measuring the activity of cholinesterase in body fluids.

These and other objects and advantages of the invention will become apparent by reference to the following description and appended claims.

Surprisingly, it has been found that serum cholinesterase activity can be rapidly and accurately measured by using a vehicle containing a substrate selected from the group consisting of acetylcholine and the salts thereof and a color indicator consisting of mixtures of phenolsulfonphthalein (phenol red) with α-naphtholphthalein.

With the measuring device of this invention, the cholinesterase content can easily be determined with a minimal number of materials, and this device has particular utility in hospital laboratories where quick and accurate analyses are essential. When using a vehicle impregnated with a combination of phenol red and naphtholphthalein and a substrate according to the invention, the serum cholinesterase content can be measured semi-quantitatively after only about 3–8 minutes. The period of incubation with the present device is considerably shorter than the prior art devices used for this purpose. Additionally, in tests with measuring devices employed heretofore, it was necessary to repeatedly read the color tone after different periods of incubation, whereas with the present measuring device, an accurate analysis of cholinesterase activity can be made from only one measurement of color tone after a short period of incubation, if desired together with a second measurement at the beginning of the incubation period. Therefore, the measuring device of this invention affords a considerable saving in time in the determination of serum cholinesterase activity in comparison with other known methods and devices.

As the vehicle that can be used in conjunction with the indicator, it is possible to use any inert adsorbent organic or inorganic solid. Among the preferred bibulous vehicles are cellulose, e.g. filter paper, fibrous glass, silica gel, and aluminium oxide.

Further suitable vehicles are foils of cellulose acetate or of polymer sponges, preferably polyurethane. The vehicles administered may be colorless or white, the latter being preferable.

The indicator and the acetylcholine are preferably dissolved in a solvent and then applied to the vehicle. The solvent is subsequently evaporated. Solvents suitable for both the substrate of acetylcholine and the indicator are organic solvents, mixed with water, if desired, such as alcohols, and particularly the lower alkanols, such as methanol, ethanol, isopropanol. Also suitable are ketones and ethers, such as acetone, dioxane, and tetrahydrofuran.

The substrate can be applied to the vehicle in the form of a solution of the free acetylcholine. However, it has been found particularly suitable to impregnate the vehicle with a solution of an acetylcholine salt, preferably an acetylcholine hydrohalogenide, such as the hydrochloride, the hydrobromide or the hydroiodide and a mixture of the salts. The hydroiodide has the advantage of not being hygroscopic. Other suitable salts of acetylcholine include the sulfate and the perchlorate.

The salts are obtained either in the acetylcholine synthesis or by means of cation exchanger from other acetylcholine salts. Of course the acetylcholine salts, used for the preparation of the vehicle, must be applied in an anhydrous form, in order to avoid the falsification of the pH determined by the partial hydrolysis of said salts. This is particularly important with hygroscopic salts such as the hydrochloride.

The combination of phenol red with naphtholphthalein used as the indicator in the present invention is especially effective in measuring the cholinesterase activity of older sera which are slightly alkaline since distinct color variations can be detected upon slight changes in pH in the weakly alkaline range. The mol ratio of phenol red to naphtholphthalein in the indicating device according to the invention is from about 1:0.5 to 1:5, preferably 1:3. It is to be noted here that most vehicles adsorb phenol red less readily than they adsorb naphtholphthalein. On the preparation of an indicator vehicle according to the invention, therefore, a finished vehicle with a mol ratio phenol red/naphtholphthalein of 1:3 is obtained starting with a solution of the indicator mixture in the ratio of 1:1.

In general, the pH of the indicator solution is from about 5 to 8.5, and preferably 6. If desired, the solution of the indicator and substrate can be adjusted to the desired pH before application thereof to the vehicle. When acidic salts of acetylcholine are employed, the pH can be adjusted by the addition of an equivalent amount of an alkaline substance, preferably an alkaline hydroxide, such as an alkali metal hydroxide—particularly sodium hydroxide or potassium hydroxide—or by the addition of other alkaline compounds, e.g., an alkaline salt, such as an alkali metal carbonate or bicarbonate, such as sodium carbonate, sodium bicarbonate, potassium carbonate, or potassium bicarbonate. In the event free acetylcholine is employed as the substrate, the pH is adjusted to the desired range by the addition of an acidic substance, such as hydrochloric acid. The alkaline or acidic substance used to adjust the pH is added preferably in solution, for example in aqueous or alcoholic solutions.

It is advantageous to dissolve the indicator, substrate, and any alkaline or acidic substance in a common solvent and then to apply the resultant solution to the vehicle. In such instances, it is desirable to impregnate the vehicle with an alcoholic solution containing about 5–30%, preferably about 15% by weight of acetylcholine and/or acetylcholine salt and preferably about 0.05–0.2%, more preferably about 0.1%, of the color indicator. To increase the amount of substrate and indicator per unit area, the vehicle can be impregnated successively with the substrate and indicator or with solutions thereof. The sequence in which the ingredients are dissolved in a common solution or in which they are applied to the vehicle is substantially immaterial.

The vehicle to be impregnated can be in the form of strips, sheets, or any other shape. When the vehicle, in its original shape, is inconvenient for use as a final product, it is cut into a convenient shape after evaporation of the solvent. For example, an impregnated filter paper can be cut into squares, rectangles, or strips. To avoid any alteration in color tone, the impregnated vehicle is desirably stored in an opaque air-tight container.

The use of the above-described solution as an impregnant for bibulous vehicles provides a sufficiently large amount of acetylcholine substrate to react with the enzyme; consequently, the enzyme concentration of the serum is the rate-limiting factor in the reaction.

The proportions of ingredients in the finally produced measuring device are advantageously 100 parts by weight of vehicle; generally from 2 to 20, preferably 8 to 12 parts by weight of substrate; generally 0.01 to 0.6, preferably 0.02 to 0.2 parts by weight of phenol red; and generally 0.05 to 1.5, preferably 0.05 to 0.5 part by weight of naphtholphthalein. Since body fluids contain at most 15 I.U./ml. of cholinesterase, satisfactory tests can be conducted by using preferably from 0.02 to 0.15 ml. of sample per cm.$^2$ of indicator device.

1 cm.$^2$ of vehicle area (e.g. a vehicle in the form of a square each side measuring 1 cm.) in the preferably used form corresponds to about 12.5 mg. of vehicle weight.

Utilization of the measuring device of this invention is extremely simple. The impregnated vehicle, e.g. the test paper, is brought into contact with an amount of the serum corresponding to the adsorption capacity of the vehicle to be tested, e.g. 0.05 ml./cm.$^2$ of the test paper, at a temperature of between about 15 and 25° C., and preferably at 20° C. The impregnated vehicle immediately shows the pH of the serum (pH 7.5 to about 8.2 depending on the age of the serum and on the patient's illness), wherein the comparatively small amount of the compounds on the vehicle does not influence the pH of the reaction mixture right at the beginning of the incubation period.

After a prescribed period of time—usually between about 3 and 8 minutes, preferably after 5–6 minutes—the color of the measuring device is changed by the liberation of acetic acid. The resulting color of the vehicle is compared with the colors of a standardized color scale compiled under identical conditions. The concentration of cholinesterase can be read off directly in this way.

In a preferred mode of performance the pH of the serum to be tested is read off once at the beginning of the incubation period—i.e. immediately after the combination of the serum and the impregnated vehicle—and once more after the incubation period of for example 5 to 7 minutes. The difference between these two readings of the pH is a gauge of the cholinesterase activity of the serum. Such a supplementary reading of the initial pH will avoid the errors which occur through the varying pH of the serum, and which appear particularly in the case of old sera.

The color and pH values corresponding to various levels of cholinesterase upon testing 0.04 ml. of blood serum per cm.$^2$ vehicle after 6 minutes of incubation time and at temperatures of 15 to 25° C. appear in the following Standard Table.

STANDARD TABLE (a)

| Color of vehicle | pH value | Cholinesterase content of the serum | |
|---|---|---|---|
| | | I.U./ml. (b) (37° C. pH 7) | Diagnostic evaluation |
| Deep violet | 8.8 | 0 | Very greatly reduced. |
| Violet | 8.5 | 1.7 | Greatly reduced. |
| Intermediate color | 8.2 | 2.8 | Reduced. |
| Brick red | 7.9 | 3.6 | Normal. |
| Intermediate color | 7.6 | 4.2 | Do. |
| Reddish-orange | 7.3 | 4.7 | Do. |
| Orange | 7.0 | 5.4 | Do. |
| Intermediate color | 6.7 | 6.3 | Raised. |
| Yellowish-orange | 6.4 | 7.7 | Greatly raised. |
| Intermediate color | 6.1 | 10.2 | Very greatly raised. |
| Deep yellow | 5.8 | 15.0 | Do. |

Standard Table.—(a) The cholinesterase content and color of a vehicle impregnated with acetylcholine, phenol red and naphtholphthalein, respectively, on testing 0.04 ml. serum per cm.$^2$ of the vehicle at 15–25° C. after an incubation period of 6 minutes using phenol red and naphtholphthalein as indicator.
(b) The pH-values measured at 15–25° C. are expressed in the Standard Table as nontent of cholinesterase by direct conversion to International Units/ml. (37° C., pH 7.0), as these units are in normal usage in medicine.

The diagnostic evaluations based on the pH values obtained are valid for a starting pH of 8.8. If the starting pH deviates from this, the difference between 8.8 and the value of the starting pH must be subtracted from the final value before the cholinesterase content and the diagnostic evaluation are read off from the Standard Table.

The method and device of the present invention are particularly advantageous when it is desired to make several determinations of cholinesterase activity simultaneously. When several determinations are to be carried out simultaneously, the device can be placed, for instance, on a palette of a suitable material, such as metal, porcelain, glass, or a plastic; and after the serum samples and the impregnated vehicles are placed in depressions of the palette, a transparent glass of plastic lid can be placed over it. An even simpler procedure involves placing the device on a slide, moistening the device with the serum, and covering it with a second slide. After a short time—e.g. after 5–6 minutes—the cholinesterase content for the whole test series can be determined by comparing the color of the device with a corresponding color shown in the Standard Table.

Cholinesterase activity, preferably in blood serum or blood plasma, is determined by the method described above. However, cholinesterase activity determinations can also be carried out with other body fluids and tissue extracts in cooperation with suitable calibration curves.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

(A) Examples for preparation of the indicating device

EXAMPLE 1

100 mg. phenol red, 100 mg. naphtholphthalein and 15 g.. of acetylcholine hydrochloride are dissolved in 100 ml. of methanol. By the addition of 0.1 N caustic soda solution thereto, the pH is adjusted to 6.0. Filter papers (Schleicher-Schüll paper No. 2043b) are impregnated with this solution by immersion and then air-dried. The finished paper contains

|  | Mg. |
|---|---|
| Acetylcholine hydrochloride | 1.1 |
| NaCl | <0.001 |
| Phenol red | 0.011 |
| Naphtholphthalein | 0.031 | per cm.$^2$ paper (wherein 1 cm.$^2$ of the not impregnated paper weighs 12.7 mg.).

The paper is cut into strips about 1 cm. wide and stored in a tightly closed container.

Instead of filter papers paper of glass fiber or foils of cellulose acetate may be used as a vehicle.

EXAMPLE 2

62 mg. phenol red, 62 mg. naphtholphthalein, and 19 g. acetylcholine hydrobromide are dissolved in a solvent mixture of 100 ml. of acetone and water, the volume ratio of the solvents being 10:6, respectively. The pH of the resulting solution is adjusted to 6 by the addition of a potassium hydroxide solution thereto. Glass fiber paper or filter paper is then impregnated with this indicator solution by immersion.

EXAMPLE 3

70 mg. phenol red, 70 mg. naphtholphthalein, and 15 g. acetylcholine hydrochloride are dissolved in 100 ml. methanol. The pH of the resulting solution is then adjusted to 6.0 with 1/10 N KOH solution. Bibulous vehicles are then impregnated with this indicator solution as in Example 2, above.

EXAMPLE 4

150 mg. phenol red, 150 mg. naphtholphthalein, and 25 g. acetylcholine hydrochloride are dissolved in 100 ml. 70% ethanol. The resulting solution is then adjusted to a pH of 7 by the addition of NaOH solution. Adsorbent vehicles are then impregnated with the indicator solution as in Example 2, above.

EXAMPLE 5

150 mg. phenol red, 300 mg. naphtholphthalein, and 15 g. acetylcholine sulfate are dissolved in 100 ml. of methanol. The resulting solution is then adjusted to pH 5 by the addition of NaOH-solution. The solution is applied by means of a spray (e.g. using compressed air) to a glass fiber paper in such a degree, that the finished paper has the following weight ratios:

|  | Pts. |
|---|---|
| Paper | 100 |
| Substrate | 2 |
| Phenol red | 0.02 |
| Naphtholphthalein | 0.04 |

The paper thus obtained is preferably used for measuring a blood serum or a blood plasma with a very low content of cholinesterase.

EXAMPLE 6

150 mg. phenol red, 300 mg. naphtholphthalein and 15 g. acetylcholine hydroiodide are dissolved in 100 ml. of methanol. The resulting solution is adjusted to pH 8 by the addition of NaOH solution. The solution is applied by means of a spray (e.g. using compressed air) to a filter paper in such a degree, that the finished paper has the following weight ratios:

|  | Pts. |
|---|---|
| Paper | 100 |
| Substrate | 20 |
| Phenol red | 0.2 |
| Naphtholphthalein | 0.4 |

The paper is cut in small strips and stored in a closed container.

(B) Examples of the uses of the indicating device

EXAMPLE 1

One drop of serum is placed on a slide and a piece of filter paper for the determination of cholinesterase activity, prepared according to Example A 1, laid on it and the paper covered with a second slide. The color tone is read with the aid of a color scale calibrated in accordance with the above Standard Table and the corresponding figure noted (I.U., see Standard Table, column 3). The color tone is read again exactly 6 minutes later and the corresponding figure noted (I.U., see Standard Table, column 3). The difference between the figure gives the cholinesterase activity in I.U./ml.

EXAMPLE 2

A sample of blood serum, with a low cholinesterase activity as a result of poisoning with a toxic organic phosphoric acid ester, is tested:

One drop of serum is placed on a slide, covered with a piece of filter paper, prepared according to Example A 6, and a second slide placed on it. After 8 minutes the color tone which has developed is determined. With the aid of an 8 minute calibrated table or color scale the corresponding cholinesterase activity is read off direct in International Units/ml. (without determining the starting pH).

EXAMPLE 3

A sample of fresh blood serum with normal cholinesterase activity is tested according to Eample 1, however, using the test paper mentioned in Example A 2 and with an incubation period of 3 minutes. The cholinesterase activity is read off with the aid of a three minute calibrated table or color scale.

EXAMPLE 4

The cholinesterase activity of a sample of blood plasma is determined as follows:

One drop of plasma is placed in the depression of a white plastic disk. A piece of test paper, manufactured according to Example A 1, is laid on the drop of plasma and then covered with a slide. The proceeding described in Example 1 is now followed with the exception that an incubation period of 5 minutes is observed on the basis of a 5 minute calibrated table or color scale.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What we claim is:

1. A device for measuring cholinesterase activity in body fluids, consisting of an adsorbent vehicle containing a substrate selected from the group consisting of acetylcholine and salts thereof and a color indicator consisting essentially of a mixture of phenolsulfonphthalein and naphtholphthalein wherein the mol ratio of phenolsulfonphthalein to naphtholphthalein is from about 1:0.5 to 1:5.

2. The device as defined by claim 1 wherein the weight proportions are 100 parts of vehicle, 2 to 20 parts of the substrate, about 0.02 to 0.2 part of phenolsulfonphthalein and about 0.04 to 0.5 part of naphtholphthalein.

3. The device as defined by claim 2 wherein said vehicle is a paper.

4. A process of rapidly and accurately measuring cholinesterase activity in body fluids, the steps comprising: reacting a body fluid with an adsorbent solid vehicle containing a substrate selected from the group consisting of acetylcholine and salts thereof, and a color indicator consisting essentially of a mixture of phenolsulfonphthalein with naphtholphthalein wherein the mol ratio of phenolsulfonphthalein to naphtholphthalein is from about 1:05 to 1:5, said reaction being conducted for an incubation period of about 3 to 8 minutes during which the resulting reaction mixture changes color and comparing the color of the reaction mixture with the colors obtained by the reaction of known amounts of cholinesterase with said substrate and color indicator, thereby determining the cholinesterase activity in the body fluid.

5. The process of claim 4, wherein the color comparison is made at the beginning and the end of the incubation period.

6. The process of claim 4, wherein the reaction is conducted from 5 to 6 minutes.

7. The process of claim 4, wherein the adsorbent solid vehicle is a paper.

8. The process of claim 4, wherein a vehicle with the following weight proportions is used: 100 parts of vehicle, 2 to 20 parts of the substrate, about 0.02 to 0.2 part of phenolsulfonphthalein and about 0.05 to 0.5 part of naphtholphthalein.

9. The process of claim 4, wherein the body fluid is blood serum.

10. The process of claim 4, wherein the body fluid is blood plasma.

No references cited.

ALVIN E. TANENHOLTZ, *Primary Examiner.*